United States Patent

[11] 3,602,078

| [72] | Inventor | Peter Schindler<br>Basel, Switzerland |
|---|---|---|
| [21] | Appl. No. | 851,270 |
| [22] | Filed | Aug. 19, 1969 |
| [45] | Patented | Aug. 31, 1971 |
| [73] | Assignee | F. B. Hatebur AG<br>Basel, Switzerland |
| [32] | Priority | Aug. 22, 1968 |
| [33] |  | Netherlands |
| [31] |  | 6811971 |

[54] METHOD AND APPARATUS FOR THE MANUFACTURE OF TWO ANNULAR BODIES FITTING ONE WITHIN THE OTHER
6 Claims, 7 Drawing Figs.

[52] U.S. Cl. .................................................. 83/32,
83/50, 83/55, 83/519, 83/621, 83/622
[51] Int. Cl. .................................................. B26f 1/14
[50] Field of Search .................................... 83/32, 50,
55, 519, 621, 622, 681, 687, 688, 691

[56] References Cited
UNITED STATES PATENTS

| 1,236,338 | 8/1917 | Miller .......................... |  |
|---|---|---|---|
| 1,428,174 | 9/1922 | Luther .......................... | 83/621 X |
| 2,527,091 | 10/1950 | Carrier, Jr. et al. ............ | 83/621 X |
|  |  |  | 83/621 X |

*Primary Examiner*—Frank T. Yost
*Attorney*—Kurt Kelman

ABSTRACT: A method and apparatus for manufacturing two annular members from a preformed blank, wherein the blank is supported in a female die, a coaxial blanking punch is moved relative to the die to separate inner and outer annular parts of the blank, the inner annular parts of the blank, the inner annular part being supported against axial displacement by a coaxial inner female die during perforation of the inner part by a perforating punch mounted coaxially on the blanking punch, the two female dies moving relatively while the separation of the blank parts takes place.

INVENTOR
PETER SCHINDLER
BY [signature]
AGENT

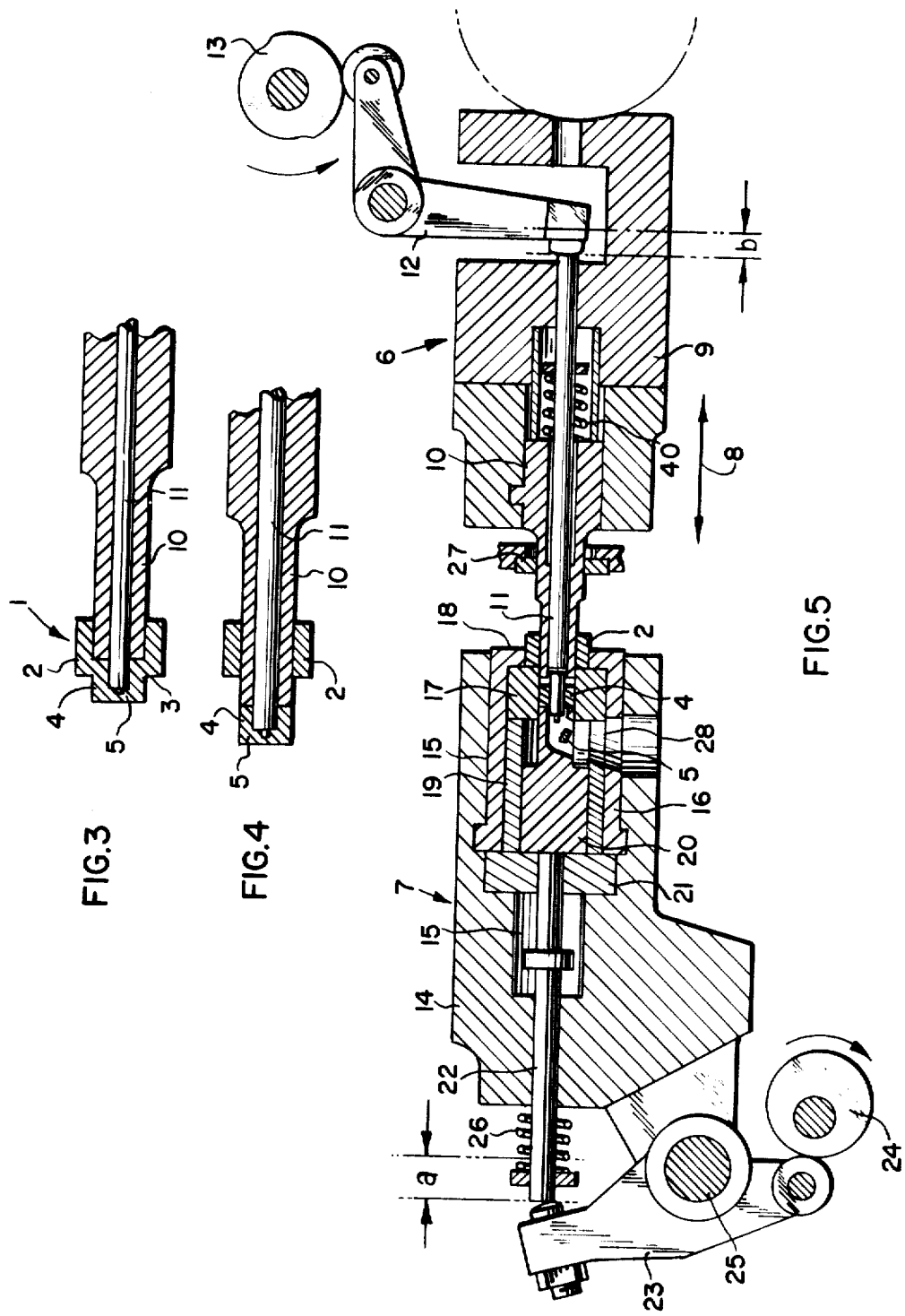

METHOD AND APPARATUS FOR THE MANUFACTURE OF TWO ANNULAR BODIES FITTING ONE WITHIN THE OTHER

The present invention relates to a method and an apparatus for the manufacture of two annular bodies which fit one within the other, from a preformed blank in the form of an inner and an outer annular part connected together by a web extending practically transversely of the longitudinal axis of the preblank, the two hollow bodies being separated from each other by employing axially directed shearing forces and the smaller hollow body being perforated.

The swarfless manufacture of annular members such as are required for example for antifriction bearing manufacture, from a preformed blank containing in stepwise manner a multiplicity of individual annular parts, by applying axial shearing forces has already been proposed. According to a known method, the blank includes successive rings which cohere in the axial direction along a shearing face the height of which permits a compensating or balancing material flow between the rings at end pressure. Preferably, the shoulder faces extending inwardly and outwardly from the shearing face are obliquely pressed with the same angle of inclination and are caused to extend plane or severing.

This method has, however, the disadvantage that the ejection of the two rings separated from each other is relatively complicated. Furthermore, the piercing punch must be arranged on the side of the female die is accessible only with difficulty because of the coolant feed. Due to the unsatisfactory cooling arrangements, this method is also suitable only for relatively thick-walled pressings.

According to one aspect of the present invention, there is provided apparatus for manufacturing two annular members capable of fitting one within the other, from a preformed blank in the form of an inner annular part and an outer annular part connected by a web, said apparatus comprising a blanking punch mounted for axial reciprocation on a reciprocable slide, a female die body arranged coaxially with said blanking punch and cooperating with the blanking punch to separate the inner and outer annular parts, an inner female die mounted for axial displacement within said female die body, a perforating punch mounted coaxially on said blanking body, a perforating punch mounted coaxially on said blanking punch and cooperating with the inner female die to perforate the inner annular part of said blank and control means maintaining said inner female die stationary against axial displacement effective to support said inner annular part during perforation thereof by said perforating punch, and permitting relative axial displacement between said inner female die and said female die body during separation of said inner and outer annular parts by said blanking punch and female die body.

With the apparatus and method of the invention, not only is an accurate, material-saving mode of manufacture and an extremely high tool outfit level ensured, but above all, also easy and trouble-free stripping of the two annular members from each other is possible. The cooling of the highly stressed tool elements is quite readily possible.

In order that the invention may more readily be understood, the following description is given, merely by way of example, reference being made to the accompanying drawings, wherein:

FIG. 3 to 5 show a first embodiment, and

Figure 1:
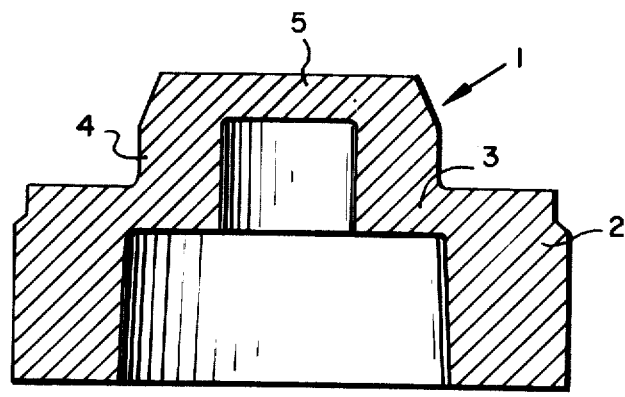
FIG. 1 shows the preformed blank requiring to be divided up into two rings in accordance with the process of the invention.

The preformed blank 1 shown in section in FIG. 1 contains, in stepwise arrangement, an outer annular part 2 connected by a web 3 with a smaller inner annular part 4. The free end face 5 of the part 4 is closed. In order to produce two rings or annular members which may be used for example as antifriction bearing races, on the one hand the parts 2 and 4 must be separated from each other by severing the web 3 and, on the other hand, the part 4 must be perforated by punching out the end wall 5.

The blank illustrated in FIG. 1 may be formed by a pressing operation from continuously fed rod stock and the details of the pressing operation are of no significance for an understanding of the present invention.

Figure 2:
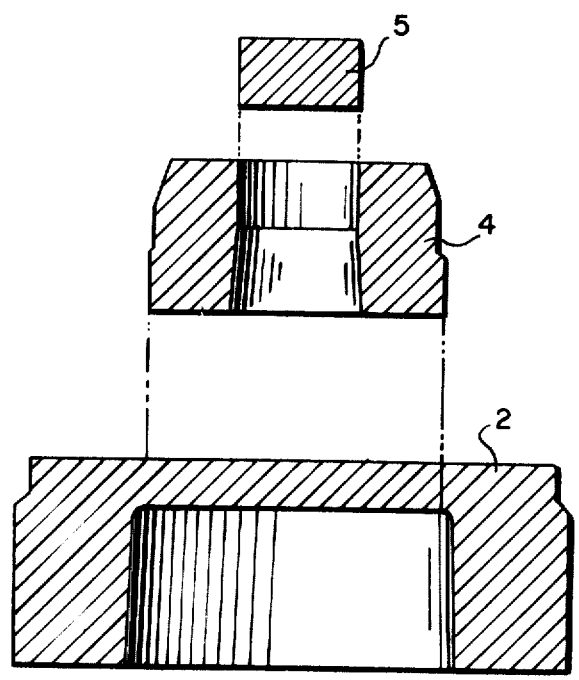
FIG. 2 shows the individual parts of the blank of FIG. 1 is disassembled by means of the method according to the invention.

FIG. 5 shows a simplified section of a first form of apparatus, with the aid of which the blank shown in FIG. 1 may, in a single-working step, be divided up into the three individual elements shown in FIG. 2. This device has a blanking punch 6 and also, arranged coaxially opposite the latter, a female die body 7. The blanking punch 6 is mounted on a press slide (not shown) performing a controlled, reciprocating movement in the direction of the double-arrow 8. The female die body 7 is rigidly secured on the frame of the press.

The blanking punch 6 has a punch housing 9 within which is arranged a parting punch 10. The parting punch 10 is rigidly connected with the housing and thus participates in the reciprocating movement of the slide. Mounted for axial displacement in the parting punch 10 is a piercing or perforating punch 11. The perforating punch is operatively connected, via a bellcrank lever 12, with a control cam 13 which enables it to perform a relative movement with respect to the parting punch 10, and this movement may be accurately determined with respect to time and stroke length. A recall spring 40 retains the perforating punch 11 in continuous contact with the bellcrank lever 12.

An annular stripper 27 is secured around the parting punch 10.

The female die body 7 has a female die housing 14 having a stepped bore 15 facing the blanking punch 6. Disposed in the said stepped bore, the axis of which corresponds to that of the blanking punch, is a sleeve or bushing 16 containing an external female die 17 in its forward section facing the blanking punch. The external female die 17 is clamped fast between the end-face side collar 18 of the sleeve 16 and a sleeve 19; its bore corresponds to the external diameter of the smaller annular part 4 of the blank.

Mounted for axial displacement within the sleeve 19 is an inner female die 20, which bears on the one hand against a fixed disc 21 and projects on the other hand, with its hollow cylindrically designed forward section, into the bore formed in the external female die 17. Through a bore formed in the disc 21 projects a rod 22 connected via a rocker lever 23 with a control cam 24, which causes the lever 23 to perform a continuous tipping or rocking movement about an axis 25 and, in so doing, urges the rod 22—and therewith the internal female die 20—in the direction of the blanking punch by the amount "$a$." A recall spring 26 retains the rod 22 in continuous contact with the rocker lever 23.

The internal female die 20, the sleeve 19, the bushing 16 and the section surrounding the latter of the female die housing 14 are formed with appropriate bores which, together, form an ejection shaft 28 downwardly directed starting from the bore of the internal female die.

THE DEVICE DESCRIBED OPERATES IN THE FOLLOWING MANNER

At the commencement of the machining process, the blank 1 (FIG. 3) is placed into position in front of the blanking punch 6 by a suitable tongs of known design. The blanking punch is in its position most remote from the female die body 7 and it now travels, with the press slide, towards the female die body 7 (FIG. 3). In so doing the blanking punch 6 engages the blank 1 and urges it into the female die body 7.

The larger annular part 2 of the blank meanwhile impinges, with its end face side, on the stationary external female die 17 and is prevented by the latter from continuing its movement.

On the other hand, the inner annular part 4 is urged by the parting punch 10 into the bore formed in the external female die 17, whereby the inner female die 20, due to the appropriate design of the control cam 24 (FIG. 5) is able to withdraw. In this way, the two hollow bodies 2 and 4 are separated from each other (FIG. 4). Subsequently, the perforating punch 11 has imparted to it, by the control cam 13, an advancing movement by the amount "b" relative to the parting punch 10; the inner female die 20 which, meanwhile, has reached its left-hand end position shown in FIG. 5 retains the inner annular part 4 of the blank, so that the punch 11 punches through the end walls of the part 4. The waste core 5 drops downwardly through the ejection shaft 28.

Then, the press slide once again moves away from the female die body, together with the blanking die 6, and carries with it the outer annular part 2 until the latter impinges against the ring 27, is stripped therefrom and drops downwardly into a container which is held ready. The small inner annular part 4 is ejected by a corresponding movement of the internal female die 20 and also drops downwardly. Jamming of the part 4 on the perforating punch 11 is of no significance, since this punch is, during the travel back of the slide, drawn by the spring 40 into the hollow blanking punch 10 so that in this way the part 4 is always stripped.

This concludes the operation and the next blank is brought up by the transverse conveying tongs.

Figure 6:
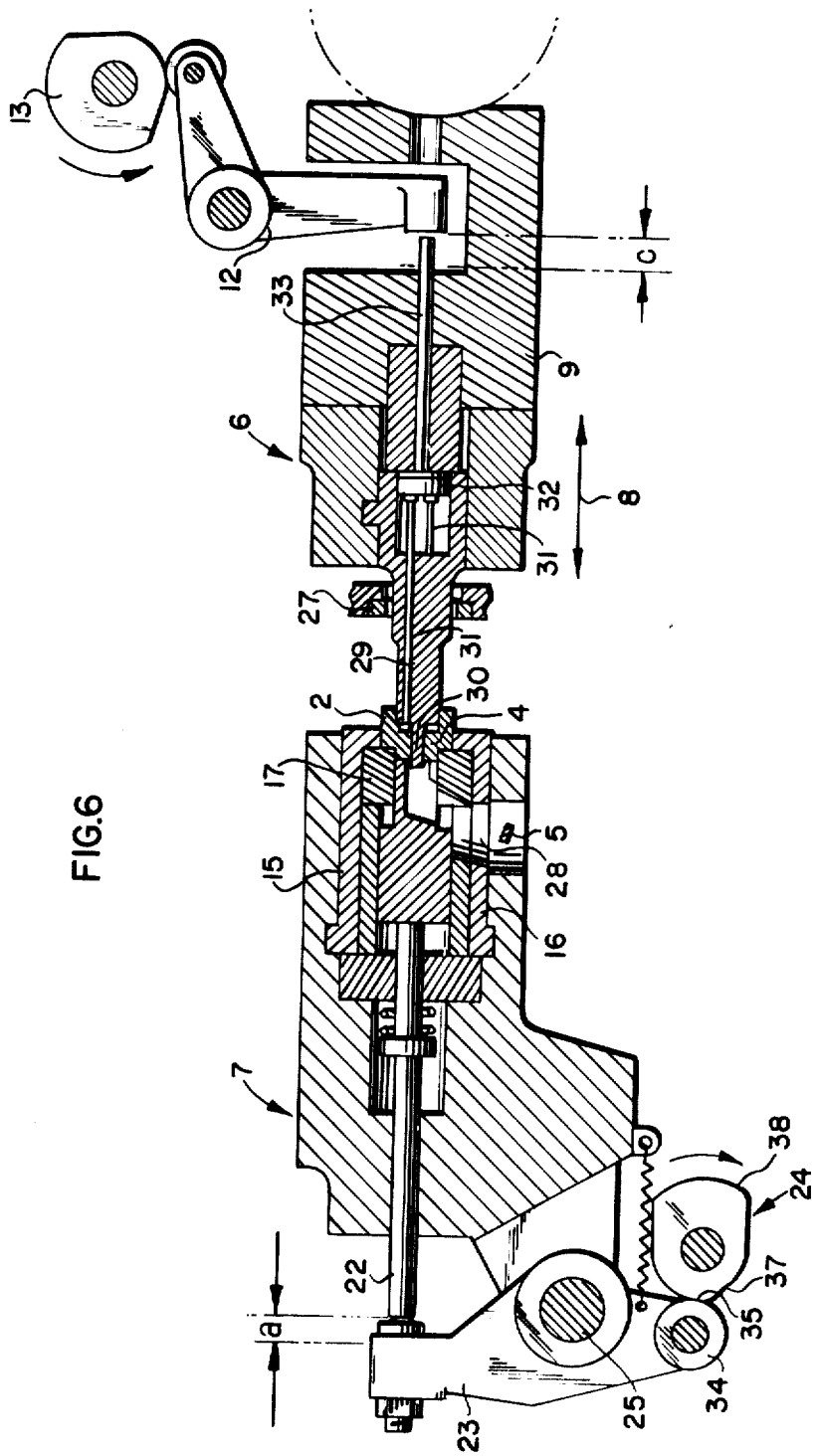
FIG. 6 and 7 show a second form of embodiment of the apparatus according to the invention.
Figure 7:
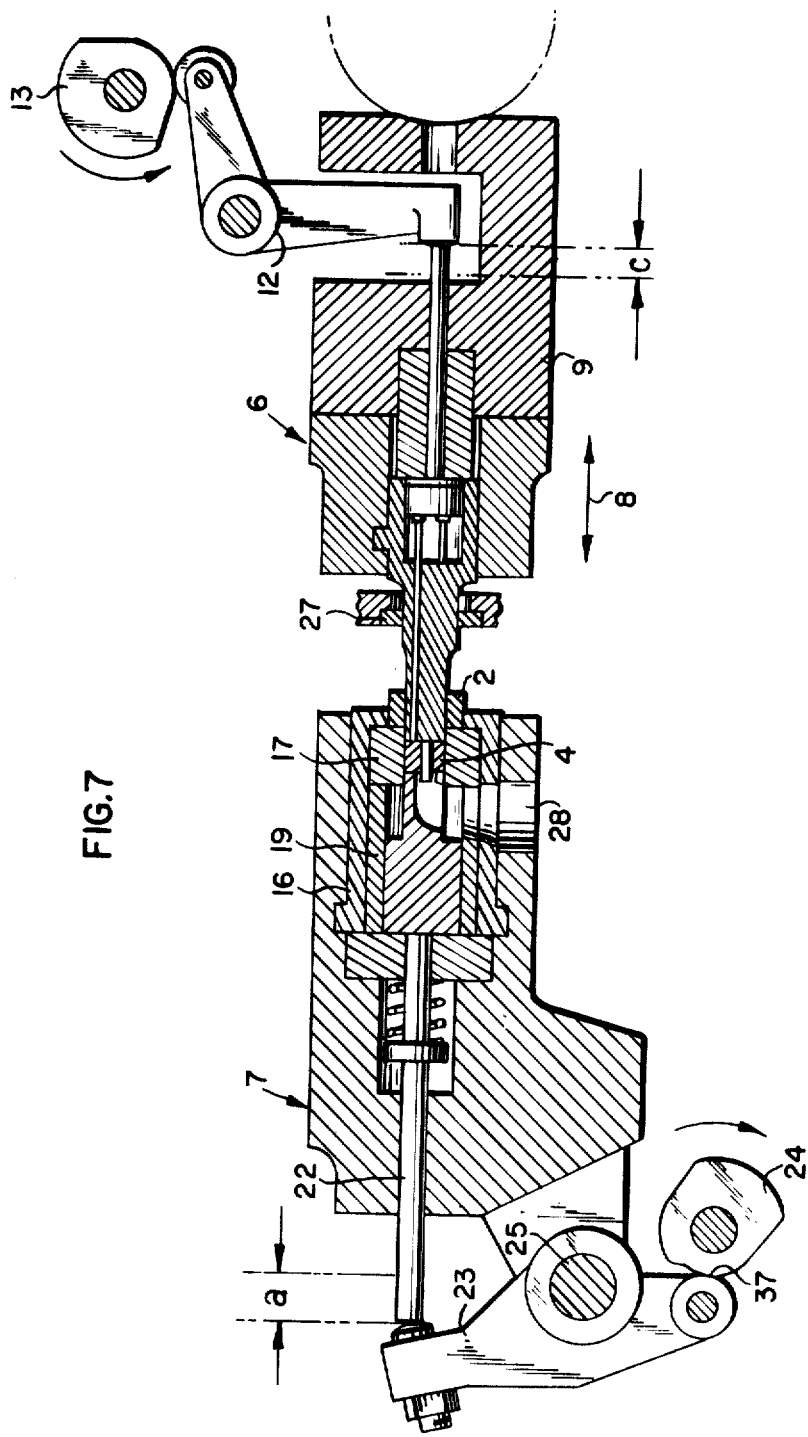

A further form of embodiment of the apparatus is shown in FIGS. 6 and 7. The elements and parts corresponding to those of FIG. 5 have been given the same reference numerals. In contradistinction to the apparatus of FIG. 5, FIGS 6 and 7 show however a stepped punch 29, the forward section 30 of which corresponds in size to that of the aperture to be punched out in the inner annular part 4. The adjacent section of the stepped punch is adapted to the bore in the outer annular part 2. Furthermore, this stepped punch has three ejector rods 31 which are offset relatively to each other through 120°, are supported on a common intermediate plate 32 and are adapted to be displaced by a control cam 13, via a bellcrank lever 12 and an actuating rod 33, in an exactly predeterminable chronological sequence. All the other constructional features of the device correspond, with the exception of the design of the control cams 13 and 24, to the embodiment shown in FIG. 5.

If, then, the blank 1 is engaged by the stepped punch 29 (FIG. 6) and is pushed into the female die body 7, then first of all the internal female die 20 remains—due to appropriate design of the control cam 24—in the intermediate position shown in FIG. 6. In this position, the roll 34 of the rocker lever 23 travels over the section 35 of the control cam 24.

The inner annular part 4 is therefore punched through by the front punch section 30 and the waste core 5 drops downwardly through the shaft 28. Subsequently, the rocker lever 23, which is subjected to the influence of a traction spring 36, contacts the section 37 of the control cam (FIG. 7). The inner female die therefore allows itself to be pressed back by the stepped die 29 and the two annular parts 2 and 4 are separated from each other.

The roll 34 of the rocker lever 23 then passes on to the section 38 of the control cam 24. Thereby, the inner female die 20 travels in the direction of the blanking punch and ejects the inner part 4. Simultaneously, the stepped die 29 withdraws once more, with the slide; the ejector rods 31 are, during this withdrawal movement of the punch die 29, urged towards the left, by an amount "c," by the control cam 13 in FIG. 6, so that they perform a relative movement with respect to the stepped punch 29, emerge out of the end face thereof and strip the inner part 4 from the punch section 30.

The large hollow body 2 is, in this case also, stripped by the stationary stripping ring 27.

On perforating the inner part 4, the inner female die 20 is, therefore, in accordance with the above description, supported on the special section 35 of the control cam 24. Intermittent supporting of this kind could, of course, also be achieved using other means.

The apparatus shown in each specific case in FIGS. 5, 6 and 7 is to be understood to constitute one of a plurality of conversion stations arranged in juxtaposition on a press. A press of this kind comprises, in general, a severing station and also three to four conversion stations, the starting material being fed continuously in rod form to the severing station.

The steps described may be performed on both cold and preheated prepressings.

What I claim:

1. Apparatus for manufacturing two annular members capable of fitting one within the other, from a preformed blank in the form of an inner annular part and an outer annular part connected by a web, said apparatus comprising, in combination:
   a. a reciprocable slide;
   b. a blanking punch mounted for axial reciprocation with said slide;
   c. a female die body arranged coaxially with said blanking punch, and effective, with said blanking punch, to separate said inner and outer annular parts;
   d. an inner female die mounted for axial displacement within said female die body;
   e. a perforating punch coaxially on said blanking punch effective with said inner female die, to perforate said inner annular part of said blank; and
   f. control means maintaining said inner female die stationary against axial displacement effective to support said inner annular part during perforation thereof by said perforating punch, and permitting relative axial displacement between said inner female die and said female die body during separation of said inner and outer annular parts by said blanking punch and female die body.

2. Apparatus as claimed in claim 1, wherein said blanking punch is mounted fixedly on said reciprocable slide and said perforating punch is axially displaceably mounted within said blanking punch and further comprising drive means effective to move said perforating punch relative to said blanking punch shortly before separation of said inner and outer annular parts.

3. Apparatus as claimed in claim 2, wherein said control means comprise a rod connected to said inner female die and a cam operating said rod to move said inner female die axially.

4. Apparatus as claimed in claim 1, wherein the blanking punch and perforating punch are formed as an integral stepped punch.

5. Apparatus as claimed in claim 4, wherein said control means comprise a rod connected to said inner female die and a cam operating said rod to move said inner female die axially.

6. A method for manufacturing two annular members capable of fitting one within the other, from a preformed blank in the form of an inner annular part and an outer annular part connected by a web, such method comprising the steps of supporting the blank in a female die body arranged coaxial with a reciprocably slidable blanking punch, moving the blanking punch relative to the female die body to separate the inner annular part from the outer annular part, supporting the inner annular part against axial displacement by means of an inner female die coaxial with the female die body during perforation of said inner annular part by a perforating punch mounted coaxially on said blanking punch, permitting said female die body and inner female die to move axially relative to one another during separation of the inner annular part from the outer annular part, and reciprocatingly sliding the blanking punch in relation to the perforating punch.